United States Patent

[11] 3,604,955

[72] Inventor Ronald Joseph Angner
Freehold, N.J.

[21] Appl. No. 14,451
[22] Filed Feb. 26, 1970
[45] Patented Sept. 14, 1971
[73] Assignee Bell Telephone Laboratories Incorporated
Murray Hill, N.J.

[54] STEP INPUT RESPONSIVE OUTPUT PULSE GENERATION CIRCUIT
16 Claims, 6 Drawing Figs.

[52] U.S. Cl. .......... 307/293, 307/260, 307/265, 328/58, 328/60
[51] Int. Cl. .......... H03k 17/28, H03k 1/18
[50] Field of Search .......... 307/260, 262, 263, 265, 268, 269, 293; 328/58, 60–62

[56] References Cited

OTHER REFERENCES

Pub I " Multivibrators Separate Pulses According To Their Width" by Pataki in Electronics dated December 8, 1969, page 88 copy in 307-265.

*Primary Examiner*—Stanley D. Miller, Jr.
*Attorneys*—R. J. Guenther and James Warren Falk

ABSTRACT: A group of timers, each having the characteristic of providing an immediate output voltage translation when an input goes from low to high and providing a delayed output voltage translation when the input goes from high to low, are arranged to detect the leading and trailing edges of a step input and to generate a step function having leading and trailing edges independently delayed from the respective leading and trailing edges of the detected step input. The delayed step function is supplied to another group of timers arranged to provide individually controllable pulse outputs in coincidence with the leading and trailing edges of the delayed step function.

INVENTOR
R. J. ANGNER
BY David H. Wannenbaum
ATTORNEY

STEP INPUT RESPONSIVE OUTPUT PULSE GENERATION CIRCUIT

FIELD OF THE INVENTION

This invention relates to pulse generating circuits in general and in particular to circuit arrangements for providing step pulse outputs in response to nonperiodic step inputs.

BACKGROUND OF THE INVENTION

Numerous situations exist where it is desired to provide a single output pulse of a fixed duration in response to an input voltage level change. For example, it is often required to provide a fixed length output pulse in response to the enabling of a key or switch. Accordingly, numerous circuits have been designed to detect a voltage level change when a switch is operated and to respond to that change by providing an output pulse of a fixed duration. Such circuits are commonly called monostable multivibrators and are arranged such that the output pulse length is independent of the length of the input pulse. An example of such a circuit is shown in J. F. Ingle, U.S. Pat. No. 3,482,148, dated Dec. 2, 1969.

Problems exist, however, in situations where it is desired to provide an output pulse or separate output pulses at the leading and trailing edges of a nonperiodic step pulse input such as is generated by the operation and subsequent release of a key. Although circuitry is available, such as shown in the N. L. Wiseman, U.S. Pat. No. 3,197,655, dated July 27, 1965, which detects either a positive voltage transition or a negative voltage transition and generates output pulses in response thereto, elaborate auxiliary circuitry is necessary to assure that the positive and negative voltage components of the transients generated when a key is operated or released do not trigger the output pulse improperly.

In situations where it is necessary to generate pulses both when a key is operated and again when the key is released, it is also usually necessary to insure that the pulses follow in sequence so that under no condition will two "operate" pulses occur without an intervening "release" pulse. In such situations, it is critical that both outputs are not triggered simultaneously and that the proper length of the output pulse is generated for the leading and trailing edges of the step input, respectively.

Additional problems exist when the output pulses which are generated in response to the leading and trailing edge of the step input are each of a different duration and wherein each must be delayed from the respective triggering edge by a different delay interval.

In addition, since an output pulse is to be generated at both the leading and trailing edges of a step input generated by the operation and release of a key, the time interval between the two triggering pulses may vary from a few seconds to a few days. Thus, it is important that a circuit arranged to detect the leading and trailing edges of such a step input is not dependent on voltage samples taken at periodic intervals or on timing schemes which measure the duration of the step input pulse.

Accordingly, one object of the present invention is to provide an economic circuit arrangement for generating individually controllable output pulses in response to the leading and trailing edges of a nonperiodic step function input.

Another object of the present invention is to provide a circuit arranged to generate a first fixed length output pulse delayed a first fixed time from the leading edge of a step input and to generate a second fixed length output pulse delayed a second fixed time from the trailing edge of the step input.

SUMMARY OF THE INVENTION

These and other objects are achieved in accordance with the present invention wherein in one embodiment a group of timers, each having the characteristic of providing an immediate output voltage transition when an input goes from low to high and providing a delayed output voltage transition when the input goes from high to low, are arranged to detect the leading and trailing edges of a step input and to provide in response thereto individually controllable separate pulse outputs in coincidence with each detected leading or trailing edge.

Accordingly, it is a feature of the present invention to provide a circuit configuration where individual delay timers are combined to alternately detect the leading and trailing edges of a step input and to respond thereto by generating output pulses of individually controllable time duration.

DESCRIPTION OF THE DRAWING

The features and attendant advantages of the instant invention will be better understood after consideration of the following detailed description in combination with the accompanying drawing in which.

DETAILED DESCRIPTION

Figures 1, 2:
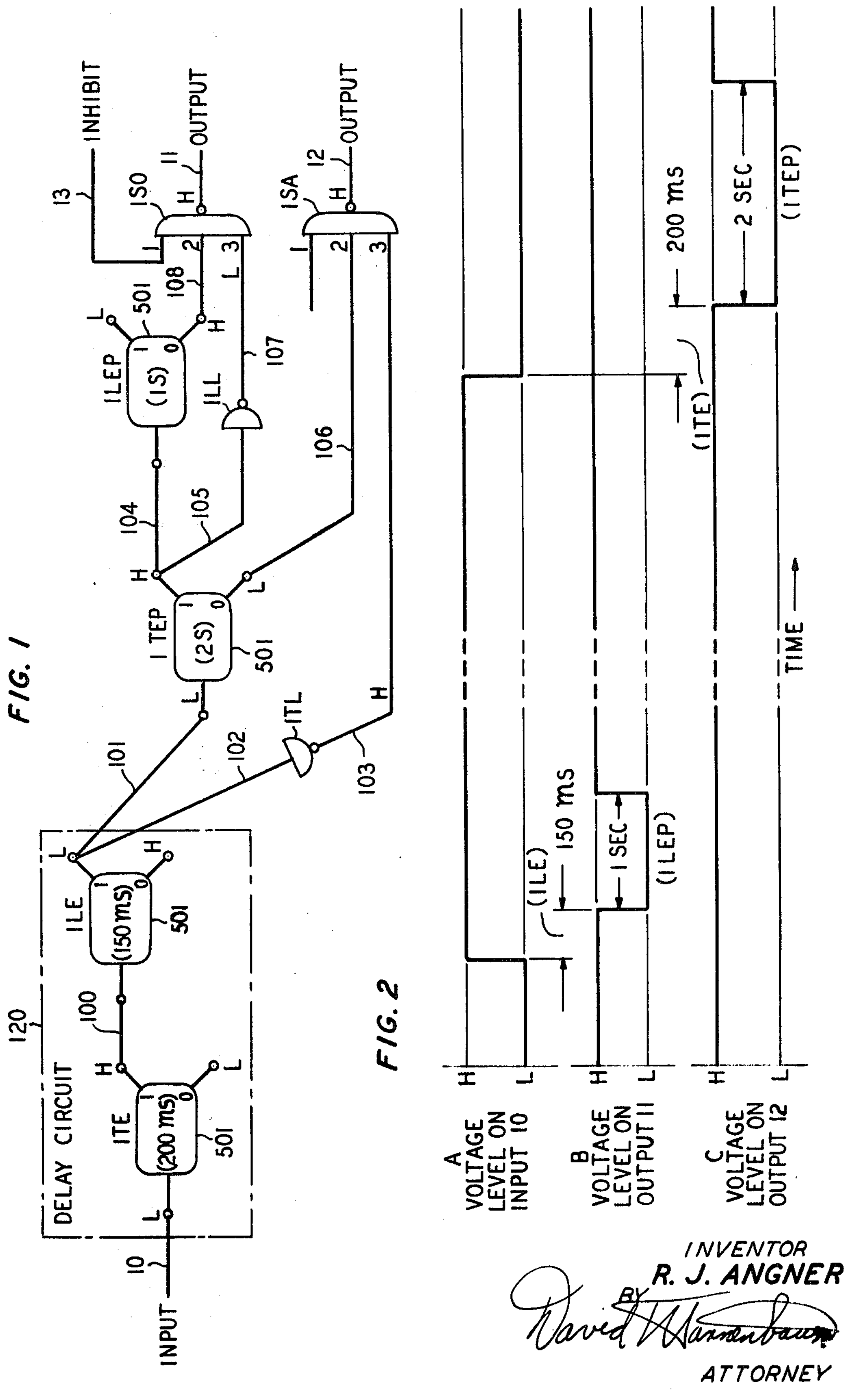
FIG. 1 is a block diagram of a circuit configuration arranged in accordance with one embodiment of the present invention.
FIG. 2 is a presentation of voltage levels useful in the explanation of the circuit shown in FIG. 1.

In FIG. 1, input 10 is connected to a pulse source (not shown) which generates level changes or voltage transitions from a low (L) voltage level to a high (H) voltage level and back to a low level, as characterized by waveform A of FIG. 2 where the abscissa represents time from some arbitrary zero before the appearance of a high voltage level. Typically, the step pulse on input 10 is generated by the operation of a key such that the low or ground level is present when the key is released and the high or positive battery level is present when the key is operated. As shown by waveform A of FIG. 2, the length of the high intervals as well as the length of the low intervals are unspecified, and in fact may vary from a few microseconds to many days.

Figure 3:
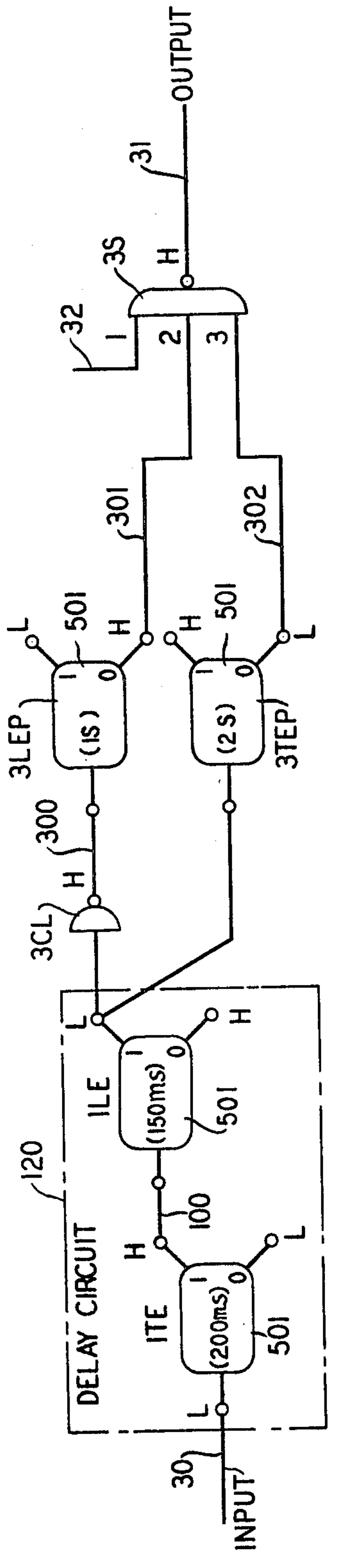
FIG. 3 is a block diagram of a circuit configuration arranged in accordance with another embodiment of the present invention.

Digressing momentarily, it should be noted that in FIGS. 1 and 3 the letters L and H have been utilized at various points in the circuit to indicate either a low or a high voltage level, respectively, which condition is representative of the voltage level at that particular location in the circuit at the arbitrarily selected zero time point. Accordingly, at the zero time point, input 10, FIG. 1, is low, as shown by waveform A, FIG. 2, while outputs 11 and 12 are both high, as indicated in FIG. 1 and as shown by waveforms B and C, respectively, of FIG. 2.

It should be noted also that each electronic gate, such as gate 1TL is arranged in any one of the well-known circuit configurations such that when a battery potential (high) is present on all inputs, the gate will be turned on and the output of the gate will be ground (low). If any input is low, the gate will be turned off and the output will be high. Such a gate is known as a NAND gate. Unused inputs of all NAND gates will be assumed to be high, and such gates are used to perform a simple inversion thereby providing the inverse of the signal applied to the input.

Figure 5:
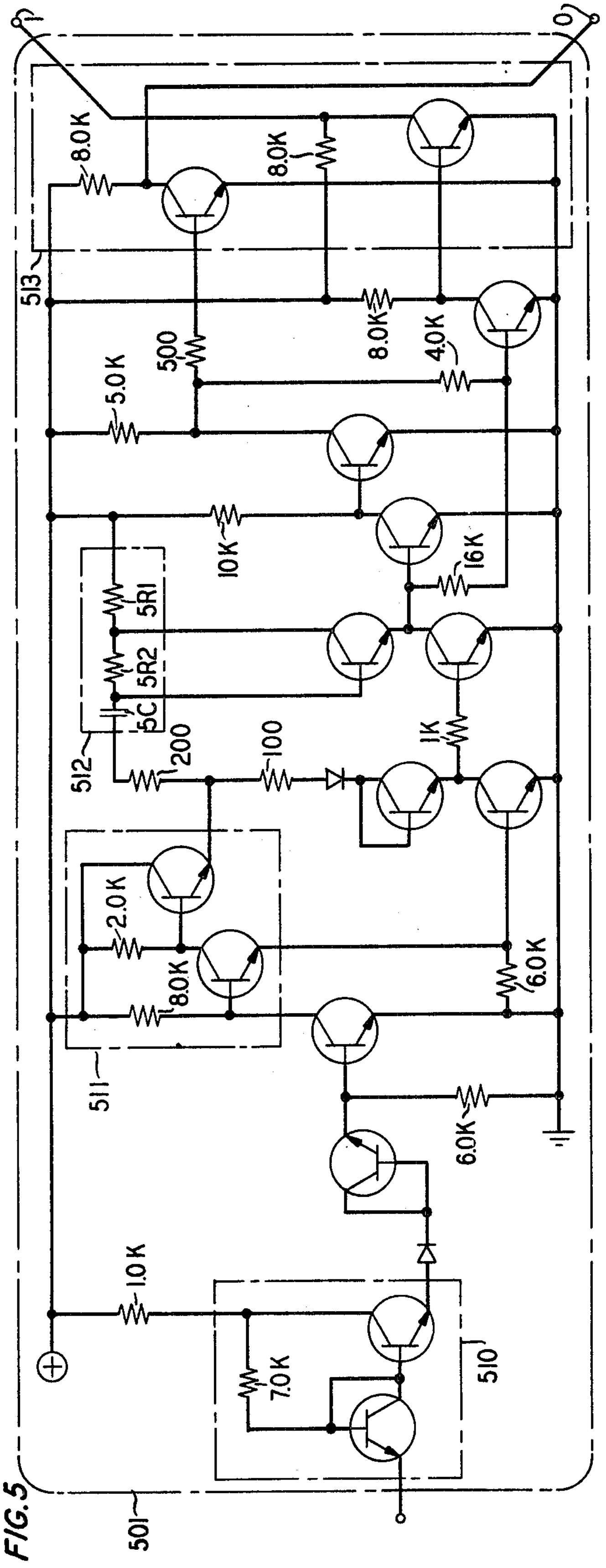
FIG. 5 is a schematic diagram of the controllable delay timer circuits shown in FIGS. 1 and 3.
Figure 6:
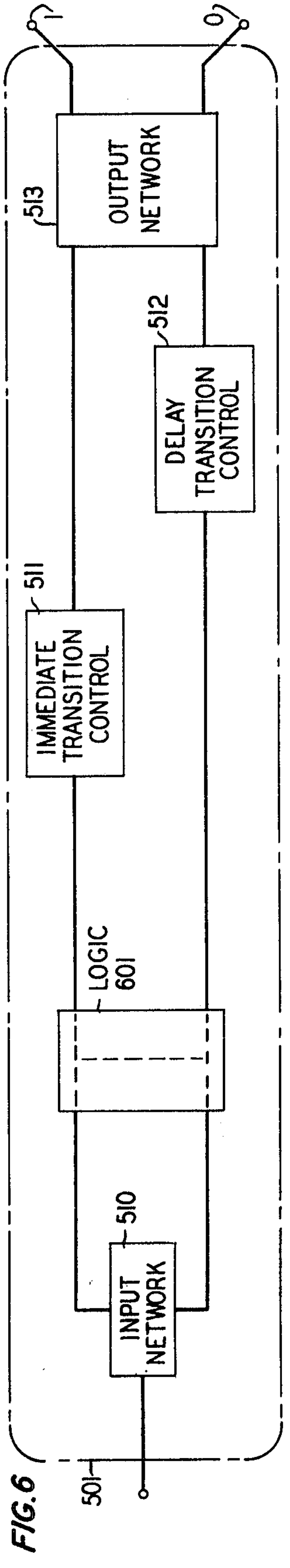
FIG. 6 is a block diagram representation of the circuit shown in FIG. 5.

Returning now to FIG. 1, input 10 is connected to the input network of a controllable timer circuit 1TE having two outputs, a "0" output and a "1" output. Controllable timer circuit 1TE, as well as the other controllable timer circuits of the instant invention, are shown in block diagram form in FIGS. 1 and 3 by the blocks labeled 501. The precise circuit arrangement of block 501 is shown in FIG. 5 with the component values shown therein representing typical values as indicated. An expanded block diagram, showing in simplified format the various elements of block 501, is illustrated in FIG. 6.

Turning to FIG. 5, the manner in which the controllable timer circuit 501 functions is explained in detail in U.S. application, Ser. No. 779,512, now U.S. Pat. No. 3,543,184 of M. S. Lane. Generally, controllable timer circuit 501 has two modes of operation. The first mode utilizes immediate transition control circuit 511 and functions to provide an immediate voltage transition between the outputs in response to a positive going input voltage transition applied to the input network 510, FIG. 6, utilizes the delay transition control circuit 512 and functions to provide delayed voltage transitions between the outputs in response to a negative going input transition with the amount of the delay controlled by an internal timer which in turn is controlled by the combination of the elements 5C, 5R2, and 5R1. As shown in FIG. 6, the output terminals "0" and "1" are controlled by output network 513 while the functions of both control circuits are shown as being controlled by logic 601.

More specifically, when the voltage to the input network 510 of controllable timer circuit 501 makes a positive transition (low to high) both outputs of the circuit immediately switch states with the "O" output switching from low to high and the "1" output switching from high to low. When the input to controllable timer circuit 501 returns from the high condition to assume a low condition, the resulting negative voltage transition causes the internal timer of controllable timer circuit 501 to begin a variable timing interval during which interval the outputs remain unchanged. At the expiration of this delay interval the outputs make a voltage transition so that the "O" output switches from high to low and the "1" output switches from low to high.

As discussed above, this delay period is controlled by the capacitive element 5C and the resistive elements 5R2 and 5R1. Typical values for these elements for a 150-millisecond delay would be 5C=5mf., 5R1=10K, and 5R2=27K; for a 2-second delay 5C=40mf., 5R1=10K, 5R2=51K. As shown in FIGS. 1 and 3, the value shown in parentheses, inside each controllable timer block 501, such as (200msec.) in timer 1TE, represents the delay interval of that timer which interval has been arbitrarily selected for discussion purposes herein. As will become more apparent from that which is contained hereinafter, any delay interval desired may be selected for each timer.

Separate Output Pulses at the Leading and Trailing Edges of a Step Input with Each Output Pulse Delayed from the Respective Edge Turning again to FIG. 1, as discussed above and as illustrated by FIG. 2 waveform A, when input 10 is low outputs 11 and 12 are both high. When the leading edge of a step input is applied to input 10, the voltage level thereon makes a positive transition from low to high and the outputs of controllable timer 1TE, in the manner previously explained, make an immediate transition so that the "0" output becomes high and the "1" output becomes low. Accordingly, a negative voltage transition is impressed on lead 100 (high to low) thereby causing controllable timer 1LE to begin a delay interval. The outputs of timer 1LE retain their initial states at this time so that leads 101 and 102 both remain low. Accordingly, output gates 1SO and 1SA remain off and outputs 11 and 12 remain high as shown in FIG. 2 waveforms B and C.

After the lapse of 150 milliseconds, (the delay interval of timer 1LE) the outputs of controllable timer 1LE change state so that leads 101 and 102 now become high. The high condition on lead 102 is inverted by gate 1TL thereby preventing output gate 1SA from turning on at this time. The positive voltage transition from low to high on lead 101 causes the outputs of controllable timer 1TEP to switch immediately so that output "0" becomes high while output "1" becomes low. Thus controllable timer circuit 1TEP acts as an inversion gate in this mode. The voltage on lead 104 goes through a negative transition from high to low causing the output of controllable timer 1LEP to maintain its previously assumed state for the delay interval of one second. Therefore, lead 108 remains high at this point. The low on lead 105 is inverted by gate 1LL to a high on lead 107 to input 3 of gate 1SO.

Assuming at this point that inhibit lead 13 has a high thereon, accordingly, all inputs to NAND gate 1SO are high, thereby turning on the output gate 1SO and causing output 11 to go low. This voltage transition on output 11 can be seen in FIG. 2, waveform B, after the delay interval of 150 milliseconds caused by controllable timer 1LE. As shown in FIG. 2, waveform B, the starting point of the 150 milliseconds delay was controlled by the leading edge of the step input shown in FIG. 2, waveform A. After the lapse of one second, as controlled by controllable timer 1LEP, lead 108 goes low due to the voltage transition of the output leads of controllable timer 1LEP, thereby releasing the output gate and causing output 11 to return to a high condition as illustrated in FIG. 2, waveform B.

Digressing momentarily, it will be noted that had there been a low condition on inhibit lead 13, output gate 1SO would have remained off. Accordingly, separate control of each output gate is thereby effected to inhibit all or selected output pulses on a selective basis. Each output gate could be separately controlled for inhibiting purposes, or both could be controlled from the same lead.

It will be noted also that at this point in time no timing functions are currently being performed in any of the controllable timers of the instant embodiment so that as long as input 10 remains high, corresponding to the enabling of a key or other device, the potential on outputs 11 and 12 will remain high, as shown in FIG. 2, waveforms B and C.

When input 10 returns to a low condition, controllable timer 1TE begins to time for a 200-millisecond interval during which period the circuit remains quiescent. At the end of the timing delay the voltage on lead 100 makes a positive transition thereby enabling the outputs of controllable timer 1LE to switch immediately so that the voltage level on leads 101 and 102 goes from high to low. The low on lead 101 represents a negative voltage transition thereon from high to low. This negative transition causes controllable timer 1TEP to begin a 2-second timing delay with the output on lead 106 being maintained high throughout the interval. The low on lead 102 is inverted by gate 1TL causing a high on terminal 3 of NAND gate 1SA. Thus, a high on all the inputs of NAND gate 1SA causes output 12 to switch from a high voltage level to a low voltage level as shown in FIG. 2, waveform C, at the end of a 200-millisecond delay controlled by controllable timer 1TE. As seen in FIG. 2, waveform C, the starting point of the 200-millisecond delay was controlled by the trailing edge of the step function input shown in waveform A. At the end of the 2-second delay, as controlled by controllable timer 1TEP, lead 106 goes low thereby turning output gate 1SA off and returning output 12 to a high condition.

In summary, at the leading edge or positive transition of a step input, output 11 as well as output 12 remains normal. After the expiration of 150 milliseconds, as controlled by delay timer 1LE, output 11 turns on and remains on for one second under control of timer 1LEP, thereby generating an output pulse of 1-second duration. At the trailing edge or negative transition of the step input, outputs 11 and 12 again remain normal. After the expiration of 200 milliseconds, as controlled by timer 1TE, output 12 turns on and remains on for 2 seconds under control of timer 1TEP thereby generating an output pulse of 2-second duration.

Accordingly, in response to the leading and trailing edges of a step function input, separate output pulses are generated, one in response to the leading edge of the step input and one in response to the trailing edge of the step input with each output pulse having an individually controlled width and with each pulse occurring at an individually controllable delay interval from the respective leading and trailing edges of the step input.

Although two separate outputs 11 and 12 have been illustrated, it will be understood that the outputs could be combined so that output pulses would be generated at the leading and trailing edges of the step input on the same output lead instead of on separate leads as described herein. Each pulse could have a separately controllable width and could be delayed an individually controllable time interval from the respective edge of the step input or, as will be seen from that which is to follow, each output pulse can be generated coincident with the respective edge of the step input, with each pulse width separately controllable.

Output Pulse on a Single Lead Having an Individually Controlled Width at the Leading and Trailing Edges of a Step Input Turning now to FIG. 3, and assuming a short circuit path around delay circuit 120, then when input 30 has a low voltage thereon output 31 is high. This condition may be seen from FIG. 4, waveforms A and B. When input 30 makes a positive transition from low to high, controllable timer 3TEP switches such that lead 302 switches from low to high. Concurrently, the high condition on input 30 is inverted by gate 3CL causing lead 300 to have a negative transition thereon which in turn causes the outputs of delayed timer 3LEP to maintain their original condition such that lead 301 maintains a high thereon. Accordingly, output NAND gate 3S turns on at this time causing output 31 to go low. This condition may be seen in FIG. 4, waveforms A and B.

Figure 4:
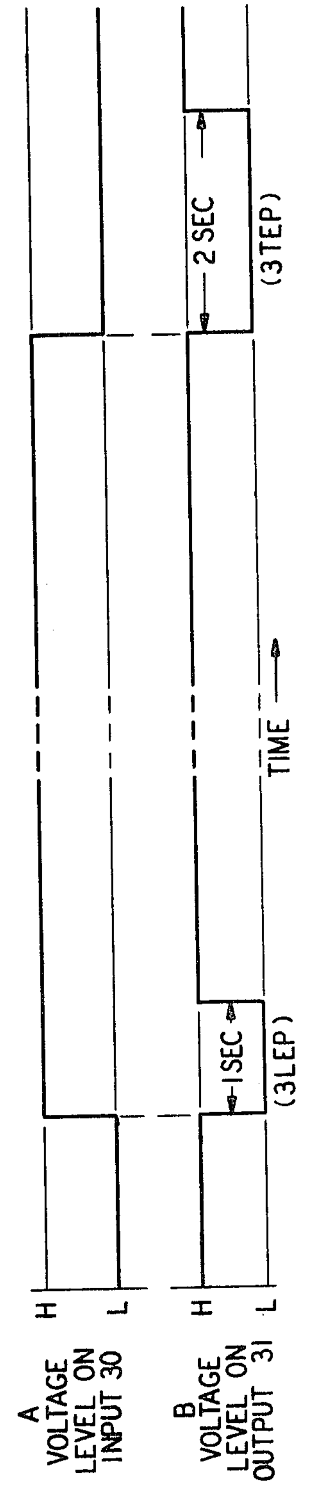
FIG. 4 is a presentation of voltage levels useful in the explanation of the circuit shown in FIG. 3.

At the termination of a 1-second delay interval as controlled by the internal timer of controllable timer circuit 3LEP, the outputs of controllable timer circuit 3LEP make a voltage transition such that lead 301 goes from high to low thereby turning off output NAND gate 3S and causing output 31 to resume a high condition, as shown in FIG. 4, waveform B. Accordingly, at the leading or positive transitional edge of a step input a 1-second pulse output has been generated. As discussed previously, no timers are currently activated so that the voltage configurations now present in FIG. 3 may remain in their present condition as long as the input 30 remains high.

When input 30 makes a negative voltage transition from high to low, controllable timer 3TEP begins a 2-second delay interval and lead 302 remains high. The voltage on lead 300 at this time makes a positive transition going from low to high thereby causing the outputs of controllable timer 3LEP to switch immediately so that lead 301 again assumes a high condition. Since leads 301 and 302 now both have high's thereon, output gate 3S is turned on and output 31 goes low and remains low and remains low throughout the 2-second timing interval controlled by the internal timer of controllable timer circuit STEP. At the end of the 2-second delay, lead 302 again assumes its low condition and output 31 returns high. Accordingly, a single output pulse of 2-second duration has been generated in response to the trailing or negative transitional edge of the step pulse input.

Conclusion

What has been described hereinabove is a specific illustration of two embodiments of the present invention. Numerous modifications may be made by those skilled in the art without departing from the spirit and scope of the present invention. For example, the polarity of the pulses may be reversed; or negative voltage potentials substituted for positive potentials; or only one edge of the step input may be delayed, with the delay signal applied to a common output gate or separate output gates. In addition, the output gates may be arranged as electromechanical devices having an operate winding and an inhibit winding. Also, the inhibit lead of the output gate could be controlled by a machine function so that the output pulse, or pulses, are coincident with some internal machine function.

What is claimed is:

1. A circuit for providing a first output pulse in response to a leading edge of a step input signal and a second output pulse in response to the trailing edge of said step input signal comprising output gate means, a pair of controllable timer circuits each including an input terminal, an output terminal, and a first and a second control means interconnecting said input and output terminals, said first control means providing immediate output signals at said output terminal on input signal transitions at said input terminal and said second control means providing time delayed output signals at said output terminal on input signal transitions at said input terminal, input means for receiving said step input signal and applying said step input signal to said input terminal of one of said controllable timer circuits, and inversion means for connecting said input means to said input terminal of the other of said controllable timer circuits, whereby said first control means of said one timer circuit and said second control means of said other timer circuit cause said output gate means to generate a timed pulse responsive to said leading edge of said step input signal and said second control means of said one timer circuit and said first control means of said other timer circuit cause said output gate means to generate a timed pulse responsive to the trailing edge of said step input signal.

2. The invention set forth in claim 1 wherein said inversion means includes said one controllable timer circuit and a second output terminal thereof, said first and second control means interconnecting said input terminal and said second output terminal so that the output signal on said second output terminal is the inverse of the output signal on said first-mentioned output terminal of said one controllable timer circuit.

3. The invention set forth in claim 1 wherein said inversion means comprises a NAND gate connected between said input means and said input terminal of said other controllable timer circuit.

4. The invention set forth in claim 1 wherein said output terminals of said controllable timer circuits are arranged to maintain distinct voltage levels thereon and are controlled by an input network in each of said controllable timer circuits responsive to said first control means for enabling a voltage transition at said output terminal immediately upon detection of a positive voltage transition applied to said input network and responsive to said second control means for enabling a voltage transition at said output terminal of said first and said second controllable timer circuits delayed by a first and a second timing interval, respectively, upon detection of a negative voltage transition applied to said input network, whereby each said timed output pulse responsive to said trailing edge has a width controlled by said second timing interval.

5. The invention set forth in claim 4 wherein said input means comprises means for detecting said leading edge of said step input signal and for detecting said trailing edge of said step input signal, said detecting means comprising means for generating a delayed step input having a leading edge delayed from said leading edge of said step input signal by a third interval and a trailing edge delayed from said trailing edge of said step input signal by a fourth interval whereby said timed output pulses from said gating means responsive to said step input signal leading and trailing edges are delayed therefrom by said third and fourth intervals, respectively.

6. The invention set forth in claim 5 wherein said detecting means includes a third and fourth controllable timer circuit each including an input terminal, an output terminal, and first and second control means interconnecting said input and output terminals;

said third and fourth controllable timing circuits being connected in series.

7. The invention set forth in claim 1 further comprising means for selectively inhibiting said output gate means.

8. A circuit for providing output pulses in response to a step input signal comprising output pulse generating means and means for enabling said generating means in response to a positive voltage transition and in response to a negative voltage transition of said step input signal comprising a pair of controllable timer circuits each having an input terminal connected to an input network and first and second output terminals arranged to maintain distinct voltage levels thereon, said output terminals connected to an output network in each said controllable timer circuit and each said output network operable for enabling a voltage transition between said connected output terminals, circuit input means for receiving said positive and negative voltage transitions and for applying received voltage transitions to said input terminal of one of said controllable timer circuits, inversion means for connecting the inverse of said voltage transition to said input of said other controllable timer circuit, first mode control means interposed between said input and said output networks in each of said controllable timer circuits operative in response to a positive voltage transition applied to said input network for immediately enabling said output network, and second mode control means interposed between said input and said output networks in each of said controllable timer circuit operative in response to a negative voltage transition applied to said input network for delaying said enabling of said output network a first and a second interval, respectively, said controllable timer circuits interconnected such that said first output terminal of said one controllable timer circuit is connected to said output pulse generating means and said first output terminal of said other controllable timer circuit is connected to said output pulse generating means whereby said output pulse generating means is enabled to provide a first output pulse having a width equal to said first interval, said first output pulse coincident with each positive voltage transition of said step input signal applied to said controllable timer circuits and to provide a second output pulse having a width equal to said second interval, said second output pulse coincident with each negative voltage transition of said step input signal applied to said controllable timer circuits.

9. The invention set forth in claim 8 wherein said circuit input means includes a pulse delay circuit comprising third and fourth controllable timer circuits having third and fourth intervals, respectively, whereby said first output pulse is delayed by said third interval from the positive voltage transition of said step input signal and said second output pulse is delayed by said fourth interval from the negative voltage transition of said step input signal.

10. The invention set forth in claim 8 wherein said output pulse generating means comprises a first NAND gate, and said inversion means comprises a second NAND gate.

11. The invention set forth in claim 8 wherein said output pulse generating means comprises a first NAND gate for generating said first output pulse, and a second NAND gate for generating said second output pulse.

12. The invention set forth in claim 11 wherein said priorly mentioned inversion means includes a connection from said second output terminal of said first controllable timer circuit to said input terminal of said second controllable timer circuit, second inversion means for connecting said second output terminal of said first controllable timer circuit to said first NAND gate, and third inversion means for connecting said circuit input means to said second NAND gate.

13. The invention set forth in claim 8 further comprising means for selectively inhibiting said enabling of said output pulse generating means.

14. A circuit for providing a first output pulse in response to the leading edge of a step input signal and a second output pulse in response to the trailing edge of said step input signal comprising output gate means, first and second timer means each including an input terminal, at least one output terminal, means for applying input terminal voltage transitions immediately to said output terminal, and means for applying input terminal voltage transitions to said output terminal after a predetermined delay, said output terminal having a voltage thereon representing one of two binary values, means connecting said input signal directly to said first timer means input terminal, means connecting an inverted input signal to said second timer means input terminal, and means connecting said output terminals of said first and second timer means to said gating means, said first and second timer means output terminals having opposing binary value voltages thereon prior to the occurrence of a step input signal.

15. A circuit in accordance with claim 14 wherein said means connecting an inverted input signal to said second timer means includes said first timer means and a second output terminal thereof, said second output terminal having the inverse voltage thereon to the voltage on said priorly mentioned first timer means output terminal.

16. A circuit in accordance with claim 14 wherein said means connecting an inverted input signal to said second timer means includes an inverting gate circuit.